(12) United States Patent
Shiga (10) Patent No.: US 8,536,757 B2
(45) Date of Patent: Sep. 17, 2013

(54) THREE-PHASE BRUSHLESS DC MOTOR

(75) Inventor: Naoto Shiga, Saitama (JP)

(73) Assignee: Tamron Co., Ltd., Saitama (JP)

( * ) Notice: Subject to any disclaimer, the term of this patent is extended or adjusted under 35 U.S.C. 154(b) by 411 days.

(21) Appl. No.: 12/814,988

(22) Filed: Jun. 14, 2010

(65) Prior Publication Data

US 2010/0314962 A1  Dec. 16, 2010

(30) Foreign Application Priority Data

Jun. 15, 2009  (JP) ................................. 2009-142598

(51) Int. Cl.
| H02K 1/14 | (2006.01) |
| H02K 37/14 | (2006.01) |
| H02K 19/12 | (2006.01) |
| H02K 1/18 | (2006.01) |
| G03B 7/10 | (2006.01) |

(52) U.S. Cl.
USPC .............. 310/216.021; 310/49.31; 310/49.53; 310/49.22; 310/40 MM; 310/68 B; 396/260

(58) Field of Classification Search
USPC ............. 310/40 MM, 162, 165, 49.01, 49.23, 310/49.29, 49.31, 49.53, 49.08, 49, 11, 156.51, 310/216.021, 216.019, 81; 396/259, 260
See application file for complete search history.

(56) References Cited

U.S. PATENT DOCUMENTS

| 3,344,325 | A | * | 9/1967 | Sklaroff ........................ 318/696 |
| 4,276,490 | A | * | 6/1981 | Saldinger ...................... 310/184 |
| 4,315,171 | A | * | 2/1982 | Schaeffer .................... 310/49.53 |
| 4,322,144 | A | * | 3/1982 | Suzuki et al. ................. 396/259 |
| 4,782,353 | A | * | 11/1988 | Ogihara et al. ............... 396/463 |
| 4,874,975 | A | * | 10/1989 | Hertrich ........................ 310/186 |
| 5,432,644 | A | * | 7/1995 | Tajima et al. .............. 360/99.04 |
| 5,780,944 | A | * | 7/1998 | Sakamoto ................... 310/49.53 |
| 5,859,486 | A | * | 1/1999 | Nakahara et al. ...... 310/216.004 |
| 6,043,574 | A | * | 3/2000 | Prudham .................... 310/49.08 |
| 6,670,731 | B2 | * | 12/2003 | Kotani et al. .............. 310/49.24 |
| 6,921,999 | B1 | * | 7/2005 | Stridsberg ................ 310/156.01 |
| 7,116,902 | B2 | * | 10/2006 | Kayama et al. .................. 396/85 |
| 7,358,629 | B2 | * | 4/2008 | Yamamoto et al. ......... 310/49.26 |
| 7,535,134 | B2 | * | 5/2009 | Oki et al. ..................... 310/67 R |
| 2007/0090716 | A1 | * | 4/2007 | Oki et al. ....................... 310/216 |

FOREIGN PATENT DOCUMENTS

| DE | 10341443 | * | 5/2005 |
| JP | 60-254027 | * | 12/1985 |
| JP | 61-092146 | * | 5/1986 |
| JP | 2559827 B2 | | 9/1996 |
| JP | 09-19123 | * | 1/1997 |

(Continued)

*Primary Examiner* — Burton Mullins
(74) *Attorney, Agent, or Firm* — The Webb Law Firm (57) ABSTRACT

An object of the present invention is to provide a three-phase brushless DC motor providing a high torque and performs stable operations which can be used even when an installation space is restricted. To achieve the object, the present invention adopts an inner rotor-type three-phase brushless DC motor in which an inner rotor-type three-phase brushless DC motor comprising a rotor provided with a plurality of magnetic poles divided equally in a circumferential direction at an outer peripheral of the rotor and a stator separately arranged along an outer peripheral of the rotor, wherein the stator is provided with M−n (wherein, n is an integer equal to or larger than 1) of stator sections each provided with three stator poles each having different phases, and the relationship between number of magnetic poles provided in the rotor and the total number of stator poles is made different from the conventional one.

6 Claims, 5 Drawing Sheets

(56) References Cited

FOREIGN PATENT DOCUMENTS

| | | | |
|---|---|---|---|
| JP | 09-37530 | * | 2/1997 |
| JP | 2003-88010 | * | 3/2003 |
| JP | 2003-125568 | * | 4/2003 |
| JP | 2003-158834 | * | 5/2003 |
| JP | 2005057903 A | | 3/2005 |
| WO | 2005-071817 | * | 8/2005 |

* cited by examiner

THREE-PHASE BRUSHLESS DC MOTOR

TECHNICAL FIELD

The present invention relates to an inner rotor-type three-phase brushless DC motor in which a rotor provided with a magnet is arranged at center side and a stator is arranged at outside of the rotor.

BACKGROUND ART

Various kinds of motor are used as driving sources for a lens moving mechanism for a zooming lens, a focusing lens, and the like in an optical devices such as a camera, a moving mechanism such as a diaphragm mechanism for brightness adjustment, and a moving mechanism provided in electrical products. For example, Japanese Patent No. 2559827 discloses an optical device using a pulse motor as a driving source for moving a movable lens or a diaphragm device for brightness adjustment.

In recent years, effort has been made on size reduction, less power consumption and high performance for the optical devices and electrical products. Thus, the motor used for a driving source has been required not only improved performance, for example, the starting performance, torque, operation stability, and energy efficiency but also size reduction.

For example, a motor for an optical system, focusing or zooming may be arranged around the periphery of a lens in a lens barrel. Thus, it is required for the motor to be arranged in a limited space. Moreover, according to the recent requirements for size reduction and improved performance, size reduction of the barrel section and proper speed and accuracy for zooming and focusing are required, i.e. balance between driving performance such as output power and the installation space is required for the motor. Such tendency is almost same in the moving mechanism provided in electrical products also, i.e. compact moving mechanism and high performance for driving source is required to realize both size reduction and high performance.

To catch up with such requirements, Japanese Patent Laid Open No. 2005-57903 discloses a technology on a step motor arranged in a barrel ground plate provided with a cylindrical lens or a brightness adjustment device in which output power is increased without increasing the outer diameter. The motor disclosed in Japanese Patent Laid Open No. 2005-57903 adopts a stator having a special shape and provided with a rotatable rotor provided with an annular magnet, two coils and four outer magnetic pole sections arranged around the outer periphery of and close to the magnet, and two inner magnetic pole sections arranged on the inner periphery of the magnet. In addition, arrangement of the outer magnetic pole sections is adjusted according to the angle of each outer magnetic pole section set against to rotating center of the rotor.

Because of improvement of performance in optical system devices in recent years, further improved speed and accuracy for zooming and focusing has been required. However, the pulse motors (step motors) disclosed in Japanese Patent No. 2559827 and Japanese Patent Application No. 2005-57903 which provides a starting torque lower than the torque in a constant speed motion may fail quick start when high load is required. In addition, an open loop-type system for motor control hardly follows a speed deviation caused by a variation of torque loaded.

Thus, to satisfy the above-described requirements, a three-phase brushless DC motor may be a solution to improve performance as a driving source. A three-phase brushless DC motor has a high starting torque, high acceleration performance, and excellent in speed control, i.e. it is suitable as a driving source for moving mechanisms that require quick and delicate operation.

Figure 6:
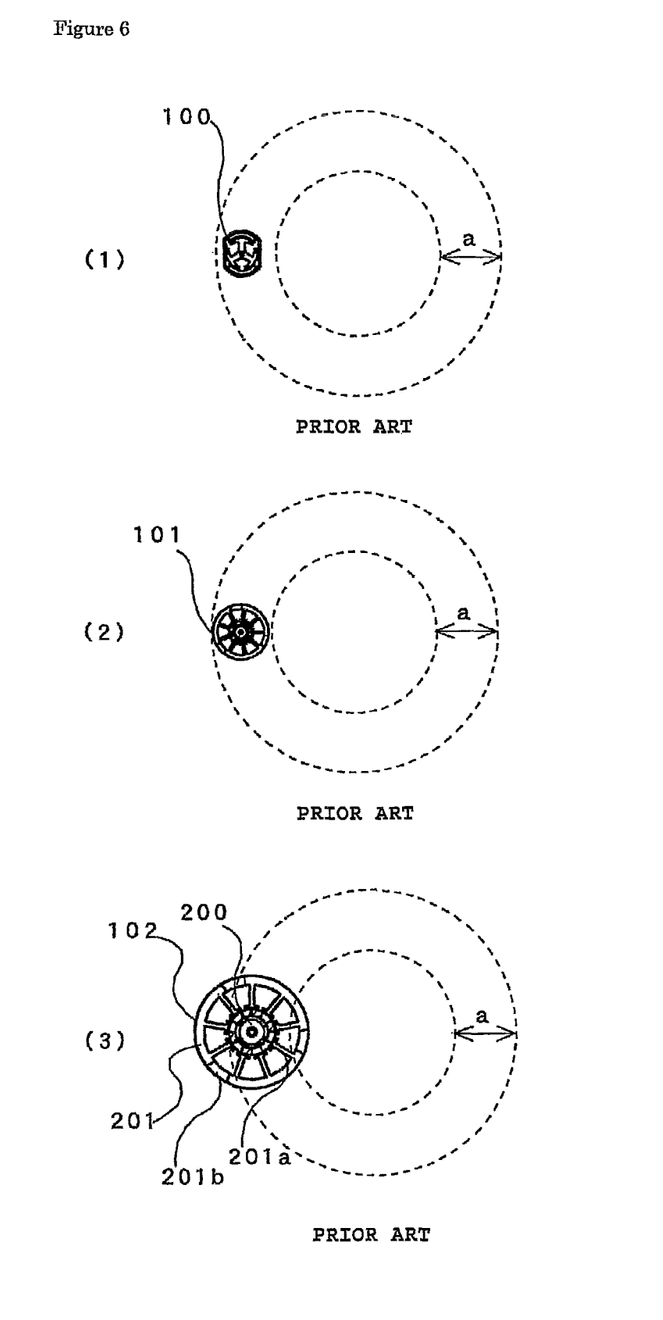
FIG. 6 is a schematic diagram illustrating an installation space of a three-phase brushless DC motor according to the conventional art when installed in an optical system device.

However, as improvement in driving performance requires increased external size in the conventional three-phase brushless DC motor, an increase in the output power of the three-phase brushless DC motor installed in a limited installation space has been a challenge. For example, in an imaging device, a plurality of lenses arranged in a lens barrel are made move in the direction of an optical axis for zooming and focusing. In an imaging device with an auto-focusing function or the like, the driving force of a three-phase brushless DC motor is used to move these lenses in the direction of the optical axis. In this case, as the motor should be arranged inside the lens barrel, the three-phase brushless DC motor is arranged in an annular space in the lens barrel or the like as shown in FIG. 6. The installation space of the motor will be described taking this case as an example.

FIGS. 6(1) to 6(3) are schematic diagrams showing a conventional example in which a motor is mounted on a ground plate that is an annular flat plate on which a lens can be installed in center of a lens barrel. FIG. 6(1) shows an example in which a brush DC motor 100 is arranged in the lens barrel. In the moving mechanism, a speed reducer is provided to transmit the rotation of the motor as a driving source. However, a speed reduction ratio is required to be made big because torque is low when the brush DC motor 100 is used. As a result, a loud driving sound and a low transmission speed not suitable for quick response may arise as a problem to be solved.

FIG. 6(2) shows an example in which a conventional three-phase brushless DC motor 101 is provided. When the conventional three-phase brushless DC motor is used, the external size of the motor is restricted by the size of an annular piece in the direction of an arrow (a) as shown in FIG. 6(2). Thus, the diameter of a stator needs to be smaller than the size of an annular piece in the direction of the arrow (a). In this case, the diameter of a rotor should be reduced to make achieving of big torque hard.

In contrast, the torque can be increased by increasing the size of a rotor 200 in a three-phase brushless DC motor 102 as shown in FIG. 6(3). However, the volume for wound coil should be increased against to the size of the rotor 200 and it may result increased external size in the three-phase brushless DC motor 102. So, it has been difficult to provide a high-torque three-phase brushless DC motor as a motor arranged in a limited space, for example, in the lens barrel.

In view of the above-described problems, an object of the present invention is to provide a three-phase brushless DC motor having a high torque and stable operations with reduced installation space.

SUMMARY OF INVENTION

As a result of intensive studies, the present inventors have achieved the above-described object by adopting the three-phase brushless DC motor described below.

The three-phase brushless DC motor according to the present invention is an inner rotor-type three-phase brushless DC motor comprising a rotor provided with a plurality of magnetic poles divided equally in a circumferential direction at an outer peripheral portion of the rotor and a stator separately arranged along an outer peripheral side of the rotor characterized in that the stator is provided with M·n (wherein, n is an integer equal to or larger than 1) of stator sections each provided with three stator poles each having different phases, and the number 4M of magnetic poles provided in the rotor and the total number of stator poles 3(M−n) of the stator are expressed by the expression 1 shown below.

[Number of magnetic poles]:[the total number of stator poles]=[4M]:[3(M−n)]   [Expression 1]

Wherein, M is an integer equal to or larger than 3, n is an integer equal to or larger than 1 and (M−n) is an integer equal to or larger than 2.

In the three-phase brushless DC motor according to the present invention, the stator is preferable to be provided with (M−n) stator sections separately arranged in accordance with an available installation space.

In the three-phase brushless DC motor according to the present invention, the stator is preferable to be provided with (M−n)/2 stator sections arranged to make the rotor sandwiched.

In the three-phase brushless DC motor according to the present invention, the three stator poles provided in the stator section are preferable to be arranged parallel to one another.

In the three-phase brushless DC motor according to the present invention, it is preferable that M is 3 and n is 1 in Expression 1 above which shows a relationship between the number of magnetic poles in the rotor and the total number of stator poles.

In the three-phase brushless DC motor according to the present invention, the rotor and stator are preferable to be mounted on a base piece which has a shape comprising two substantially concentrically arranged circular-arc sides with different radius seen in the direction of the axis of rotation of the rotor, in the area between the two circular-arc sides of the base piece.

In the three-phase brushless DC motor according to the present invention, when a phase supplied to the stator poles in the two stator sections are arranged in order of the first, second, and third phases in one direction perpendicular to the central stator pole for one of the stator sections seen in the direction of the axis of rotation of the rotor, a phase supplied to the stator poles are arranged in order of the second, third, and first phases in the same direction perpendicular to the central stator pole for the other stator section seen in the direction of the axis of rotation of the rotor.

In the three-phase brushless DC motor according to the present invention, it is more preferable that a position detection sensor is provided on the base piece to detect a position of each of the magnetic poles in the rotor and a rotation of the rotor is controlled according to a detection result of a position detection sensor, and the position where the position detection sensors are provided is along an outer periphery of the rotor mounted and between the two circular-arc sides of the base piece where the separately arranged stator sections are not provided.

More preferably, the three-phase brushless DC motor according to the present invention is the three-phase brushless DC motor used for driving a lens, and the base piece is arranged on a plane perpendicular to an optical axis in a cylindrical lens barrel.

ADVANTAGEOUS EFFECTS OF INVENTION

The three-phase brushless DC motor according to the present invention can make the size of the rotor increase to obtain an increased torque even when the motor is installed in a site in which the installation space of the motor is restricted. As a result, even when reduction ratio of a speed reducer connected to the motor is made low, i.e. the motor can supply a sufficient torque with reduced noise generated in the speed reducer to make the motor silent and same time, accuracy in stop position of the motor can be improved also. In addition, as the motor is provided with the plurality of stator sections, it is excellent in making installation space free when compared to the conventional inner rotor-type three-phase brushless DC motor which is provided with a circular stator.

DESCRIPTION OF EMBODIMENTS

Figure 1:
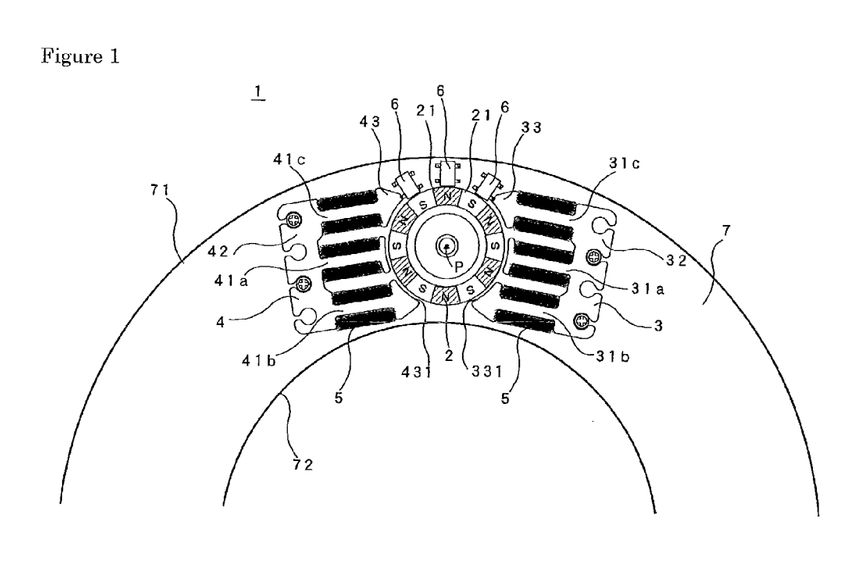
FIG. 1 is a schematic diagram showing an embodiment of a three-phase brushless DC motor according to the present invention seen in the direction of the axis of rotation of the rotor 2.

A preferred embodiment of a three-phase brushless DC motor according to the present invention will be described. FIG. 1 is a schematic diagram showing an example of an embodiment of the three-phase brushless DC motor according to the present invention arranged in a lens barrel in a camera seen in the direction of the axis of rotation of the rotor 2.

The three-phase brushless DC motor according to the present invention is an inner rotor-type three-phase brushless DC motor comprising a rotor provided with a plurality of magnetic poles divided equally in the center and a stator separately arranged along an outer peripheral side of the rotor.

The exemplified three-phase brushless DC motor 1 shown in FIG. 1 provided with a rotor 2, a stator composed of stator section 3 and the stator section 4, and a position detection sensor 6 set to detect the positions of magnetic poles 21 in the rotor 2 is the case installed in a lens barrel in an imaging device such as a camera. Two circular arcs in solid lines in FIG. 1 show a base piece 7 and is the shape of an installation site for the motor in a lens barrel as shown in FIG. 6. The three-phase brushless DC motor according to the present invention is suitable for arranging the motor provided with two stator sections around the outer periphery of the rotor 2 at an installation position with a special shape, between the two circular-arc sides as described above and the like.

The rotor 2 is provided with a plurality of magnetic poles 21 divided equally in a circumferential direction at an outer peripheral portion of the rotor 2. The rotor 2 is a device rotatable around a point P and is mounted in the base piece 7 supported and rotatable. In the embodiment shown in FIG. 1, a permanent magnet divided to 12 poles equally and alternately arranged N and S poles is provided in the outer peripheral portion of the rotor 2.

The construction of the stator provided in the three-phase brushless DC motor according to the present invention is one of the characteristic of the present invention. That is, in the three-phase brushless DC motor according to the present invention, a stator is provided with two stator sections 3 and 4 in which three stator poles 31*a* to 31*c* and three stator poles 41*a* to 41*c* are provided respectively. Then the two stator sections 3 and 4 are optionally arranged in accordance with the shape of the site where the three-phase brushless DC motor is installed. The stator sections 3 and 4 are provided with the three stator poles 31*a* to 31*c* and the three stator poles 41*a* to 41*c*, respectively. An induction coil 5 is wound in each of the three stator poles 31*a* to 31*c* and the three stator poles 41*a* to 41*c*. The method for winding the coils, a popular technology for DC motor windings may be adopted.

The pole edges 33 and the pole edges 43 both having circular-arc surfaces along the shape of the outer peripheral side surface of the rotor 2 are provided at the rotor 2-side edges of the stator poles 31*a* to 31*c* and the stator poles 41*a* to 41*c* respectively. The pole edges 33 and the pole edges 43 seen in the direction of the axis of rotation of the rotor 2 are wider than each of the stator poles 31*a* to 31*c* and the stator poles 41*a* to 41*c* and are provided with the edge surfaces 331 and the edge surfaces 431, respectively, facing along the outer peripheral side surface of the rotor 2. The width of each edge surfaces 331 and the edge surfaces 431 are made to be substantially equal to the length of the arc of each of the magnetic poles 21 in the rotor 2. In addition, certain gap is provided between the neighbor edge surfaces. For example, in the stator sections exemplified in FIG. 2, both the pole edges 33 and the pole edges 43 are separated from each other with a distance substantially equal to the length of a circular arc of angle 10° in a virtual circle (m) formed around the center of rotation P of the rotor 2 to meet a circumference corresponding to the edge surfaces 331 and the edge surfaces 431 of the pole edges. A current made to flow through the three stator poles is controlled to rotate the rotor.

In conventional three-phase brushless DC motors, a circular shape stator 201 is arranged around the periphery of a rotor 200 as shown in FIG. 6(3). Stator poles 201*a* in the stator 201 extend from an outer peripheral base 201*b* of the stator 201 toward an outer peripheral side surface of the rotor 200. The number of the stator poles 201*a* of the stator 201 is related to the number of magnetic poles in the rotor 200. In conventional three-phase brushless DC motors, the relationship between the number of magnetic poles and the number of stator poles is 4N:3N. For example, when N is 3, the number of magnetic poles is 12, and the number of stator poles is 9. However, when the space for arrangement is restricted, it is difficult for the conventional three-phase brushless DC motor which has construction described above to achieve higher output power. So, in the present invention, the idea providing a large rotor was thought out to achieve higher output power even when the space of the installation site and the like are restricted. Not to being limited by the relationship between the number of magnetic poles and the number of stator poles, 4N:3N, the present inventors reviewed the function for relationship. The present inventors also examined the size of the rotor, the arrangement of the stator sections, and location of the stator sections with the mutual arrangement of poles in the stator.

As a result, the present inventors thought out the inner rotor-type three-phase brushless DC motor according to the present invention. That is, the three-phase brushless DC motor according to the present invention is characterized by that the stator is provided with M−n (wherein, n is an integer equal to or larger than 1) of stator sections each provided with three stator poles each having different phases, the number 4M of magnetic poles provided in the rotor and the total number of stator poles 3(M−n) of the stator are expressed by:

[Number of magnetic poles]:[the total number of stator poles]=[4M]:[3(M−n)]     [Expression 2]

Wherein, M is an integer equal to or larger than 3, n is an integer equal to or larger than 1, (M−n) is an integer equal to or larger than 2.

In the expression 2, the total number of stator poles and the number 4M of magnetic poles in the rotor is made to be 3(M−n), i.e. the number of stator sections is (M−n). The number (M−n) of stator sections is at least two. It is because when the motor is provided with only one stator section, rotating of the rotor is made difficult. For example, when the rotor is provided with 16 magnetic poles, i.e. M is 4, the number (M−n) of stator sections is 2 or 3 and the total number of stator poles is 6 or 9 according to Expression 2.

The three-phase brushless DC motor shown in FIG. 1 is provided with 12 magnetic poles in the rotor and two stator sections, and three stator poles are provided in the stator sections respectively. That is, in the relational expression for the number of magnetic poles in the rotor and the number of stator poles of the stator sections shown in Expression 2, M is 3 and n is 1. Thus, when the stator is provided with two stator sections and the number of magnetic poles is 12, performance such as a high torque, space saving, and stable driving can be achieved in a well-balanced manner. The diameter of rotor 2 in the embodiment shown in FIG. 1 is 10 mm.

In the example shown in FIG. 1, seen in the direction of the axis of rotation of the rotor 2, the neighbor stator poles 31*b* and 31*c* and the neighbor stator poles 41*b* and 41*c* are arranged parallel to the central stator poles 31*a* and 41*a* in the stator section 3 and 4. In FIG. 1, in the stator section 3 and 4, the three stator poles 31*a* to 31*c* and the three stator poles 41*a* to 41*c* extend from the stator base 32 and the stator base 42 toward the rotor 2 substantially parallel to one another. The three stator poles generate magnetic fields of the different phases.

The neighbor stator poles 31*b* and 31*c* and the neighbor stator poles 41*b* and 41*c* arranged beside the central stator poles 31*a* and 41*a* are not limited to be the shape shown in FIG. 1. For example, the stator pole 31*a* may extend to positions along a radial direction from the center of rotation P of the rotor 2. However, in consideration of the wound coil, space saving, the installation space and the like, the neighbor stator poles 31*b* and 31*c* and neighbor stator poles 41*b* and 41*c* arranged beside the central stator poles 31*a* and 41*a* are preferably arranged parallel to the central stator poles 31*a* and 41*a* as shown in FIG. 1.

Moreover, the three stator poles 31*a* to 31*c* and the three stator poles 41*a* to 41*c* are more preferable to have a substantially equal length from the stator bases to the pole edges, 32 to 33 and 42 to 43 of the stator sections 3 and 4. In addition, the lengths of the stator poles 31*a* to 31*c* and the stator poles 41*a* to 41*c* in the direction of the axis of rotation of the rotor 2 are all equal. Further, when the wound coil volumes on the stator poles 31*a* to 31*c* and the stator poles 41*a* to 41*c* are equal, uniform magnetic forces are generated to make the rotor 2 rotate stably. In the present embodiment, in each of the stator poles 31*a* to 31*c* and the stator poles 41*a* to 41*c*, the length from the stator bases to the pole edges, 32 to 33 and 42 to 43 of the stator sections 3 and 4 and the length in the direction of the axis of rotation of the rotor 2 are each 4.9 mm.

In addition, the gap between the wound coils of the stator section 3 and 4 to be a slot seen in the direction of the axis of rotation is preferably between 0.4 mm and 2.5 mm. When the gap between the wound coils are shorter than 0.4 mm, the wire winding for the induction coil 5 is made difficult. On the other hand, when the gap between the stator poles is longer than 2.5 mm, the adjustment between the stator poles and the magnetic poles in the rotor 2 is made difficult. Moreover, the wound coil thicknesses on the stator poles are preferable to be equal among the three stator poles. In the example shown in FIG. 1, the wound coil thickness is 0.8 mm.

Next, the arrangement of the plurality of stator sections constituting the stator will be described. The three-phase brushless DC motor according to the present invention is provided with (M−n) stator sections, and the number (M−n) is at least 2. The stator sections are preferable to be arranged separately. This is because the driving force of the three-phase brushless DC motor is stabilized by separately arranging the stator sections around the outer periphery of the rotor.

Moreover, in the stator, (M−n)/2 stator sections are preferable to be arranged on the respective opposite sides of the rotor to make the rotor sandwiched between the stator sections. That is, an even number of stator sections are prepared, and the outer peripheral area of the rotor seen from the axis of rotation of the rotor is divided into two regions. Then, (M−n)/2 stator sections are provided in each of the divided regions. Such arrangement makes the rotor rotate in a well-balanced manner and further stabilize the driving force of the three-phase brushless DC motor.

Figure 2:
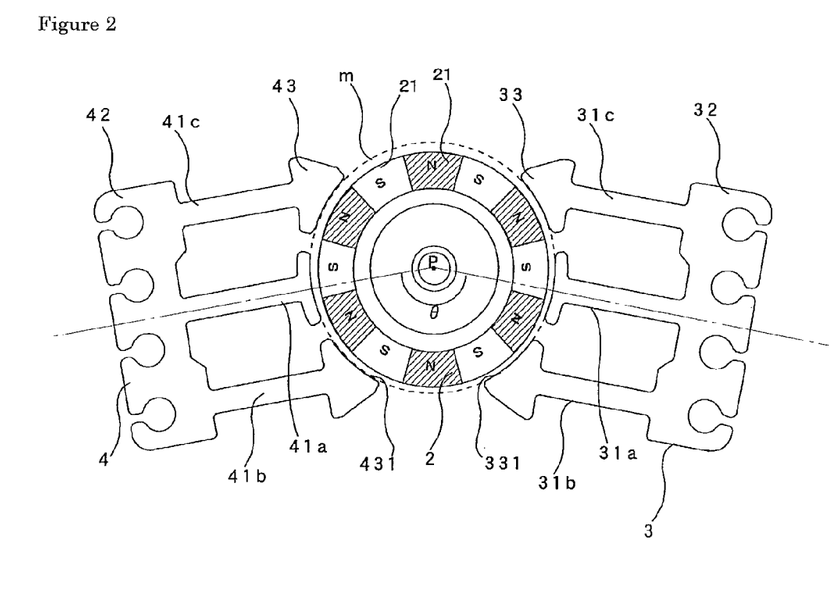
FIG. 2 is a schematic diagram showing arrangement of stator sections of the three-phase brushless DC motor in FIG. 1.

Moreover, the arrangement of the rotor 2 and the stator sections 3 and 4 will be described with reference to FIGS. 1 and 2. FIG. 2 is a schematic view seen in the direction of the axis of rotation of the rotor 2 showing how the rotor 2 and the stator sections 3 and 4 in the three-phase brushless DC motor shown in FIG. 1 are arranged. In the three-phase brushless DC motor shown in FIGS. 1 and 2, the stator sections 3 and 4 are arranged around the outer peripheral surface of the rotor 2. In each of the stator sections 3 and 4, the central stator poles 31a and 41a are arranged along the radial direction from the center of rotation P of the rotor 2. The stator section 4 is arranged such that the angle at the center of rotation P of the rotor 2 made by the central stator pole 41a of the stator section 4 and the central stator pole 31a of the stator section 3 seen in the direction of the axis of rotation of the rotor 2 is 160°. That is, the stator section 4 is arranged such that the angle at the center of rotation P made by the central stator pole 41a of the stator section 4 and the central stator pole 31a of the stator section 3 is 160° so that the edges of the stator sections 3 and 4 extend along the outer peripheral end of the base piece 7 in the lens barrel.

Now, a position detection sensor 6 will be described. The position detection sensors 6 detect the position of each of the magnet poles in the rotor 2. The three-phase brushless DC motor according to the present invention is preferable to adopt so-called closed loop control for rotation control. In the closed loop control, the position detection sensors provided detect the position of each of the magnetic poles in the rotor 2 and current flows in the stator poles 31a to 31c and the stator poles 41a to 41c are controlled according to the signal detected to control the rotation of the rotor 2.

Moreover, the three-phase brushless DC motor according to the present invention is preferable that the induction coils 5 are arranged in Y form and same phases in the stator sections 3 and 4 are connected in series. Then, the order for current flow through the induction coils 5 of the same phase in the stator sections 3 and 4 are controlled according to the position of each of the magnetic poles detected by the position detection sensors 6.

The position detection sensors 6 are provided on the base piece 7 for which the rotor 2 and the stators 3 and 4 are provided. The position detection sensors 6 are preferable to be provided at a position along the outer periphery of the rotor 2 where the stator sections separately arranged are not provided. In the three-phase brushless DC motor according to the present invention, the plurality of stator sections separately arranged enables to keep free space for providing the position detection sensors 6 around the outer periphery of the rotor 2. More specifically, three position detection sensors 6 are provided on the base piece 7 in which the rotor 2 is provided and close to the outer periphery of the rotor 2 and in the free space between the stator sections 3 and 4, so as to lie along the outer peripheral shape of the rotor 2. To control the rotation of the rotor, the three position detection sensors 6 are connected to a control unit for the three stator poles 31a to 31c in the stator section 3 and the three stator poles 41a to 41c in the stator section 4 to control the current flow in the stator poles according to the detection results from the three position detection sensors.

In the embodiment shown in FIG. 1, the position detection sensors 6 are arranged between the two circular-arc sides 71 and 72 of the base piece 7. In addition, the position detection sensors 6 are arranged around the outer periphery of the rotor 2 between the stator sections 3 and 4. That is, since the stator sections 3 and 4 are arranged in the respective areas around the outer periphery of the rotor 2, a space where the position detection sensors 6 should be provided can be secured close to the outer periphery of the rotor 2. The position detection sensors 6 for controlling the respective three phases are arranged between the two stator sections 3 and 4 in radial direction at angular intervals and close to the magnetic poles in the rotor 2 similar to those at which the pole edges 33 of the stator section 3 and the pole edges 43 of the stator section 4 are arranged. As a result, the position detection sensors 6 can be arranged in proximity to the magnetic poles in the rotor 2 to make the accuracy for detection for the rotating position of the rotor 2 improve and results improved accuracy in control of the rotational motion, suppression variation in torque and effectively controlled speed in high-speed operations. In addition, installation of the position detection sensors 6 is made easy.

Figure 3:
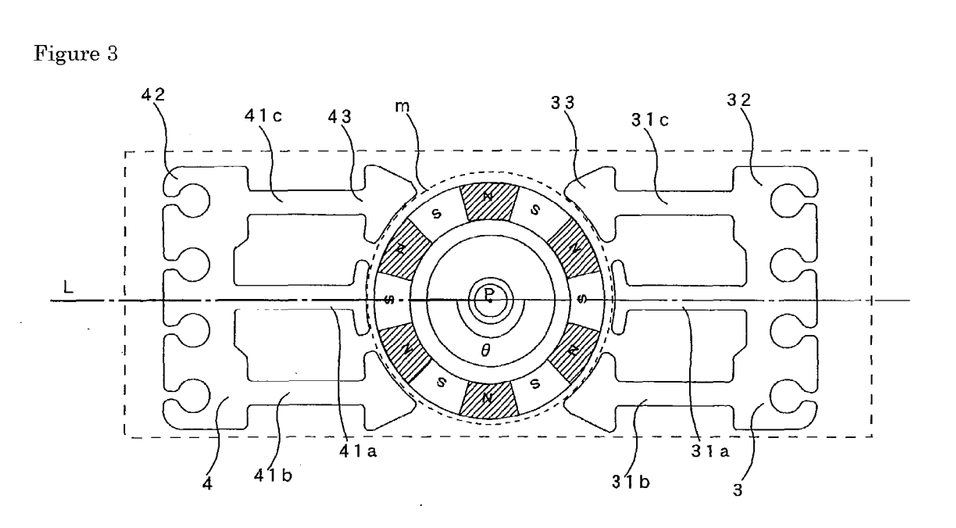
FIG. 3 is a schematic diagram showing an example of arrangement of the stator sections of the three-phase brushless DC motor according to the present invention.

FIG. 3 shows another example for arrangement of the stator sections in a three-phase brushless DC motor provided with two stator sections, the stator sections 3 and 4. As shown by a dashed line in FIG. 3, the motor may be installed in a substantially rectangular space, and the stator sections 3 and 4 may also be arranged to make the rotor 2 sandwiched by the stator sections 3 and 4 and along a straight line L passing through the center of rotation P of the rotor 2. That is, the stator sections 3 and 4 may also be arranged such that the angle at the center of rotation P made by the central stator pole 41a of the stator section 4 and the central stator pole 31a of the stator section 3 is 180°. In this case, a rotor larger than that in the conventional three-phase brushless DC motor can be installed to provide a high torque also.

Figure 4:
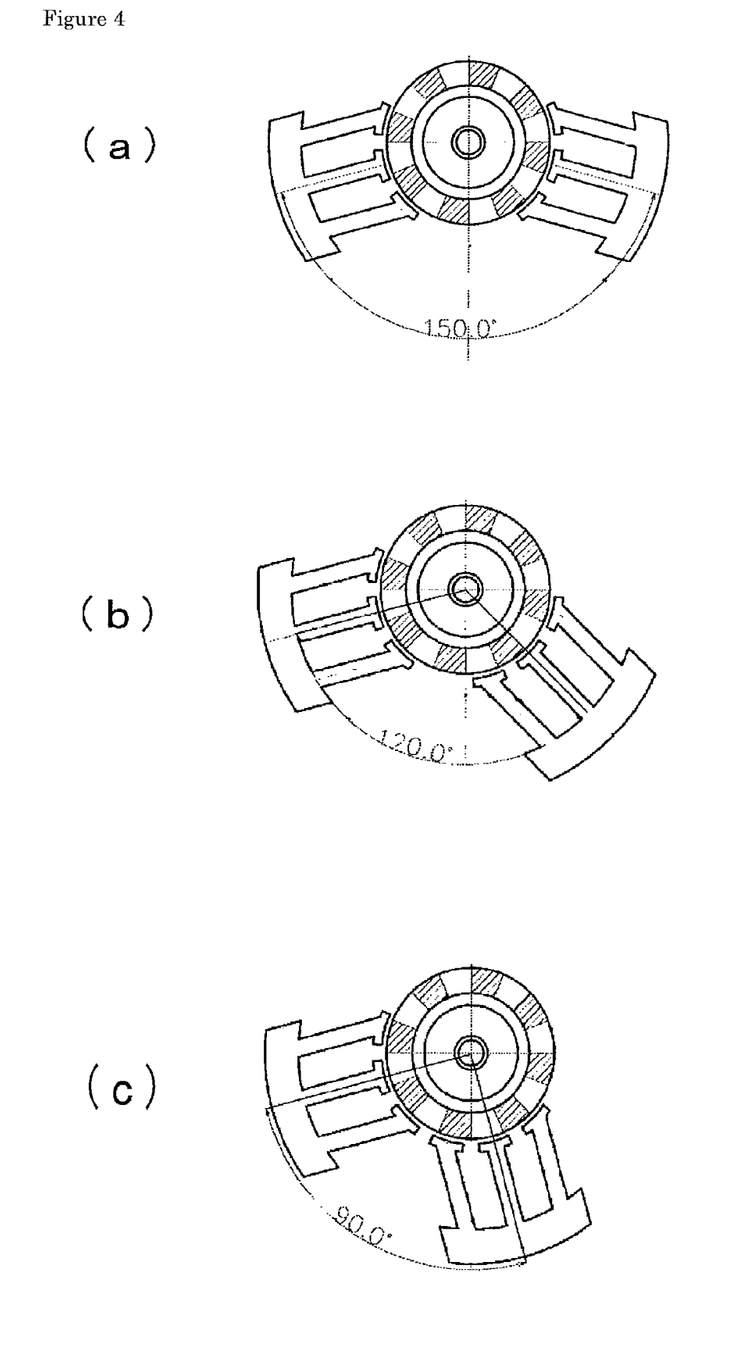
FIG. 4 is a schematic diagram showing an example of arrangement of the stator sections of the three-phase brushless DC motor according to the present invention.

FIG. 4 shows another example for arrangement of the stator sections in a three-phase brushless DC motor provided with two stator sections, the stator sections 3 and 4. In the three-phase brushless DC motor shown in FIGS. 4(a) to 4(c), the rotor is provided with 16 magnetic poles. That is, according to Expression 2, M is 4, n is 2, the number (M−n) of stator sections is 2, the number 4M of magnetic poles in the rotor is 16 and the number 3(M−n) of stator poles in the stator is 6.

FIG. 4(a) shows an example in which the stator sections 3 and 4 are arranged such that the angle at the center of rotation P of the rotor 2 made by the central stator pole 41a of the stator section 4 and the central stator pole 31a of the stator section 3 seen in the direction of the axis of rotation of the rotor 2 is 150°. In addition, FIG. 4(b) shows an example in which the two stator sections are arranged such that the angle at the center of rotation P made by the central stator pole 41a of the stator section 4 and the central stator pole 31a of the stator section 3 is 120°. The examples shown in FIGS. 4(a) and 4(b) correspond to arrangements suitable for a curved installation site such as the above-described annular arrangement space. FIG. 4(c) shows an example in which the two stator sections are arranged such that the angle at the center of rotation P made by the central stator pole 41a of the stator section 4 and the central stator pole 31a of the stator section 3 is 90°. The example shown in FIG. 4(c) is suitable for a substantially triangular installation site or when the motor is arranged in a corner of the device.

Figure 5:
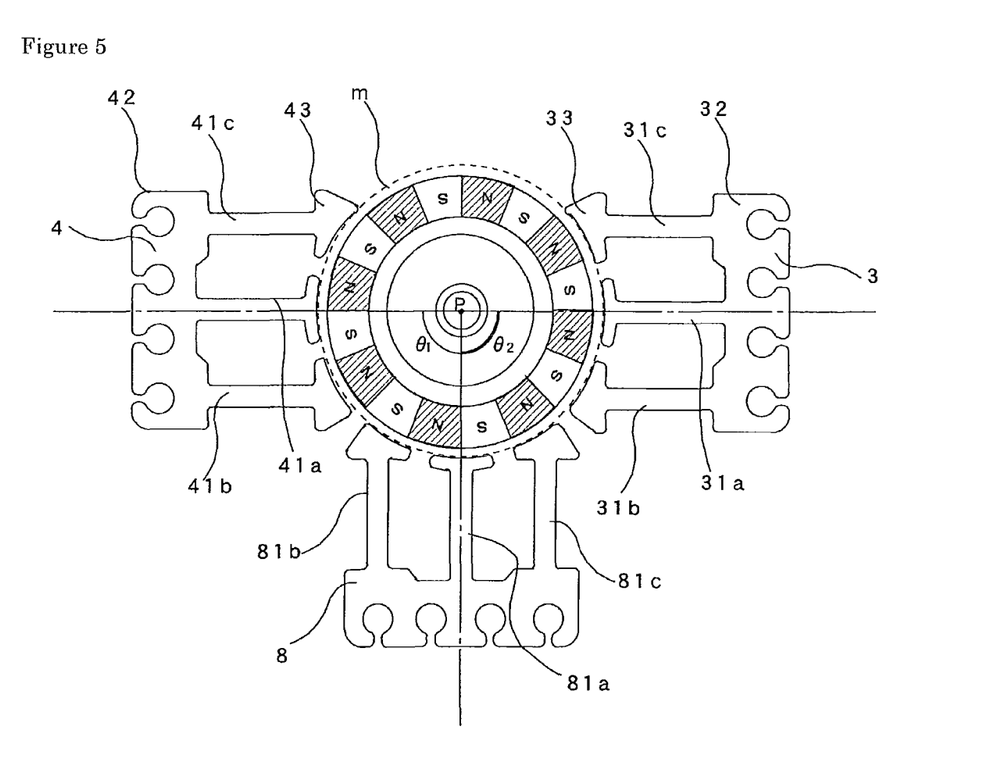
FIG. 5 is a schematic diagram showing an example of arrangement of the stator sections of the three-phase brushless DC motor according to the present invention seen in the direction of the axis of rotation of the rotor.

In addition, as shown in FIG. 5, a three-phase brushless DC motor provided with a stator comprising three stator sections can be applicable. According to Expression 2, M is 4, n is 1, the number (M−n) of stator sections is 3, the number 4M of magnetic poles in the rotor is 16, and the number 3(M−n) of stator poles is 9 in an example shown in FIG. 5.

As shown in FIG. 5, the stator sections 3, 4 and 8 can be provided to be substantially T-shaped around the center of rotation P of the rotor. That is, the first stator section 3 and the second stator section 4 are provided such that the angle at the center of rotation P made by the central stator pole 41a of the stator section 4 and the central stator pole 31a of the stator section 3 is 180°. The third stator section 8 is provided such that a central stator pole 81a of the third stator section 8 is perpendicular to the central stator poles 31a and 41a of the stator sections 3 and 4. Further, the angle θ at the center of rotation P made by the three central stator poles in the three stator sections may be set to be 60°. In this manner, even when the motor installation site is substantially triangular or substantially T-shaped, the motor can be installed without reduction of the rotor size.

The phase arrangement of the stator poles in the stator section may be changed depending on the number of stator sections and the arrangement angle. As shown in FIGS. 1 and 2, when the angle θ made by two stator sections is not 180°, the stator poles of the same phase in the stator sections 3 and 4 are arranged against the magnetic poles having the same polarity in the rotor 2. Thus, the phase-order arrangements of the stator poles in the stator sections may be changed between the two stator sections depending on the arrangement of the stator sections to make the phase arrangements in the stator sections 3 and 4 asymmetric. For example, when a phase supplied to the stator poles for one of the stator sections are arranged in order of the first, second, and third phases in one direction perpendicular to the central stator pole seen in the direction of the axis of rotation of the rotor, a phase supplied to the stator poles for the other stator section are arranged in order of the second, third, and first phases in the same direction perpendicular to the central stator pole seen in the direction of the axis of rotation of the rotor.

In the example shown in FIGS. 1 and 2, in the one stator section 3, a W phase is supplied to the central stator pole 31a, a V phase is supplied to the stator pole 31b provided closer to the inner peripheral circular-arc side 72 of the annular base piece 7, a U phase is supplied to the stator pole 31c provided closer to the outer peripheral circular-arc side 71 of the base piece 7. Then, in the stator section 4, the V phase is supplied to the central stator pole 41a, the W phase is supplied to the stator pole 41b provided closer to the inner peripheral circular-arc side 72 of the base piece 7, the U phase is supplied to the stator pole 41c provided closer to the outer peripheral circular-arc side 71 of the base piece 7. As a result, when the pole edge 33 of central stator pole 31a in the stator section 3 on which the W phase is supplied is provided against the N pole in the rotor 2, the pole edge 43 of the stator pole 41b in the stator section 4 on which the W phase is supplied is provided against the N pole in the rotor 2.

In the three-phase brushless DC motor according to the present invention, increase in the external size of the motor in the predetermined direction can be suppressed while the size of the rotor is made big for a torque increasing and the wound coil volume required depends on the magnetic flux density of the coil is ensured. That is, in the conventional stator, the coil winding section is arranged in radial all along the circumference of the rotor. In contrast, in the three-phase brushless DC motor according to the present invention, the stator sections are separately arranged in the areas around the outer peripheral side surface of the rotor. Hence, the rotor is made large but extended in just the predetermined direction to enable prevention of an increase in the external size of the motor as a whole. As a result, the size of the rotor can be increased even with a limited installation space. The motor can thus provide a high torque and stable rotation.

Moreover, the position detection sensors can be arranged close to the magnetic poles in the rotor to result improved detection accuracy for the position of each magnetic pole. As a result, driving control can be made accurate. Therefore, while utilizing the advantages of the three-phase brushless DC motor which are a high starting torque, high acceleration performance and excellent speed controllability, the three-phase brushless DC motor can provide a high torque even in a limited installation space. Moreover, when the three-phase brushless DC motor according to the present invention is used as a driving source for a moving mechanism, the speed reduction ratio of a speed reducer can be made small because of the increased torque. So, the three-phase brushless DC motor according to the present invention can improve the motor operation in both silent driving and accurate stopping.

When the three-phase brushless DC motor according to the present invention is used as a driving source to move an optical system lens, it is mounted on the plane of an annular base piece in a lens barrel which plane is perpendicular to the optical axis. In this case, by adjusting the angle θ made by two stator sections according to the circular arc shape of the base piece, the three-phase brushless DC motor makes it possible to perform quick and delicate operations required for a driving source for moving the optical system lens. This enables a reduction in time required for focusing and zooming.

In addition, of course, the three-phase brushless DC motor according to the present invention can be applied not only the case where the installation space is restricted. Even when the installation space is not restricted, separately arranging a plurality of stator sections results a free space around the motor. Thus, other components or wires can be arranged in the free space. That is, the components can be intensively arranged.

INDUSTRIAL APPLICABILITY

The three-phase brushless DC motor according to the present invention can provide a high torque by using a large rotor even when the installation space is restricted. Thus, the three-phase brushless DC motor according to the present invention can be used as a driving source for moving a lens for focusing, zooming, or the like and as a driving source for an optical devices such as a brightness adjustment device and an electric device in which a moving mechanism should be installed in a narrow space and/or closely, for example, a small electric devices provided with a moving mechanism.

The invention claimed is:

1. An inner rotor-type three-phase brushless DC motor provided in a lens barrel comprising a rotor provided with a plurality of magnetic poles divided equally in a circumferential direction at an outer peripheral portion of the rotor and a stator separately arranged along an outer peripheral side of the rotor, wherein the stator is provided with M−n (wherein, n is an integer equal to or larger than 1) stator sections each provided with three stator poles each having different phases, the rotor and stator are mounted on a base piece, which has a shape comprising two substantially concentrically arranged circular-arc sides with different radii seen in the direction of the axis of rotation of the rotor, the rotor and stator being mounted in an area between the two circular-arc sides of the base piece, when a phase is supplied to the stator poles in the two stator sections in order of first, second, and third phases in one direction perpendicular to a central stator pole for one of the stator sections seen in a direction of an axis of rotation of the rotor, a phase is supplied to the stator poles in order of second, third, and first phases in the same direction perpendicular to the central stator pole for the other stator section seen in the direction of the axis of rotation of the rotor, and the rotor is provided with 4M magnetic poles and the total number of stator poles of the stator is 3(M−n), wherein, M is an integer equal to or larger than 3, n is an integer equal to or larger than 1 and (M−n) is an integer equal to or larger than 2.

2. The three-phase brushless DC motor according to claim 1, wherein the stator is provided with two stator sections arranged to make the rotor sandwiched.

3. The three-phase brushless DC motor according to claim 1, wherein the three stator poles provided in the stator section are arranged parallel to one another.

4. The three-phase brushless DC motor according to claim 1, wherein M is 3 and n is 1 in the equation which shows a relationship between the number of magnetic poles in the rotor and the total number of stator poles.

5. The three-phase brushless DC motor according to claim 1, wherein a position detection sensor is provided on the base piece to detect a position of each of the magnetic poles in the rotor and a rotation of the rotor is controlled according to a detection result of the position detection sensor, and the position where the position detection sensor is provided is along an outer periphery of the rotor mounted between the two circular-arc sides of the base piece where the separately arranged stator sections are not provided.

6. The three-phase brushless DC motor according to claim 1, which is the three-phase brushless DC motor used for driving a lens, wherein the base piece in a cylindrical lens barrel is arranged to lie on the plane perpendicular to an optical axis.

* * * * *